United States Patent
Baker et al.

[11] Patent Number: 6,097,806
[45] Date of Patent: Aug. 1, 2000

[54] ACD WITH MULTI-LINGUAL AGENT POSITION

[75] Inventors: Daniel F. Baker, Rolling Meadows; Thaddeus Rafacz, Lisle; C. K. Venugopal, Aurora, all of Ill.

[73] Assignee: Rockwell Semiconductor Systems, Inc., Newport Beach, Calif.

[21] Appl. No.: 09/114,625

[22] Filed: Jul. 13, 1998

[51] Int. Cl.[7] .......................... H04M 3/523; H04M 1/64; H04M 11/00; G06F 17/20; G06F 15/16
[52] U.S. Cl. .................. 379/265; 379/88.06; 379/88.25; 379/93.17; 704/8; 709/207
[58] Field of Search .................. 379/265, 266, 379/142, 88.06, 88.25, 88.27, 309, 88.05, 93.17, 93.23; 709/207, 220, 221, 222; 704/8

[56] References Cited

U.S. PATENT DOCUMENTS

| | | | |
|---|---|---|---|
| 5,127,004 | 6/1992 | Lenihan et al. | 370/525 |
| 5,140,611 | 8/1992 | Jones et al. | 375/219 |
| 5,268,903 | 12/1993 | Jones et al. | 379/165 |
| 5,305,374 | 4/1994 | Snyder | 379/88.06 |
| 5,335,269 | 8/1994 | Steinlicht | 379/266 |
| 5,365,581 | 11/1994 | Baker et al. | 379/196 |
| 5,384,841 | 1/1995 | Adams et al. | 379/266 |
| 5,469,504 | 11/1995 | Blaha | 379/265 |
| 5,511,112 | 4/1996 | Szlam | 379/88.25 |
| 5,544,232 | 8/1996 | Baker et al. | 379/88.25 |
| 5,675,637 | 10/1997 | Szlam et al. | 379/142 |
| 5,946,376 | 8/1999 | Cistulli | 379/88.06 |
| 5,966,685 | 10/1999 | Flanagan et al. | 379/88.05 |

Primary Examiner—Harry S. Hong
Attorney, Agent, or Firm—Welsh & Katz, Ltd.

[57] ABSTRACT

A method and apparatus are provided for selecting a language for use by a plurality of agents of an automatic call distributor. The method includes the steps of storing an indication of the selected language in a memory of the automatic call distributor, downloading the indication to each agent station of each agent of the plurality of agents and programming the agent stations to use the selected language based upon the downloaded indication of the selected language.

24 Claims, 2 Drawing Sheets

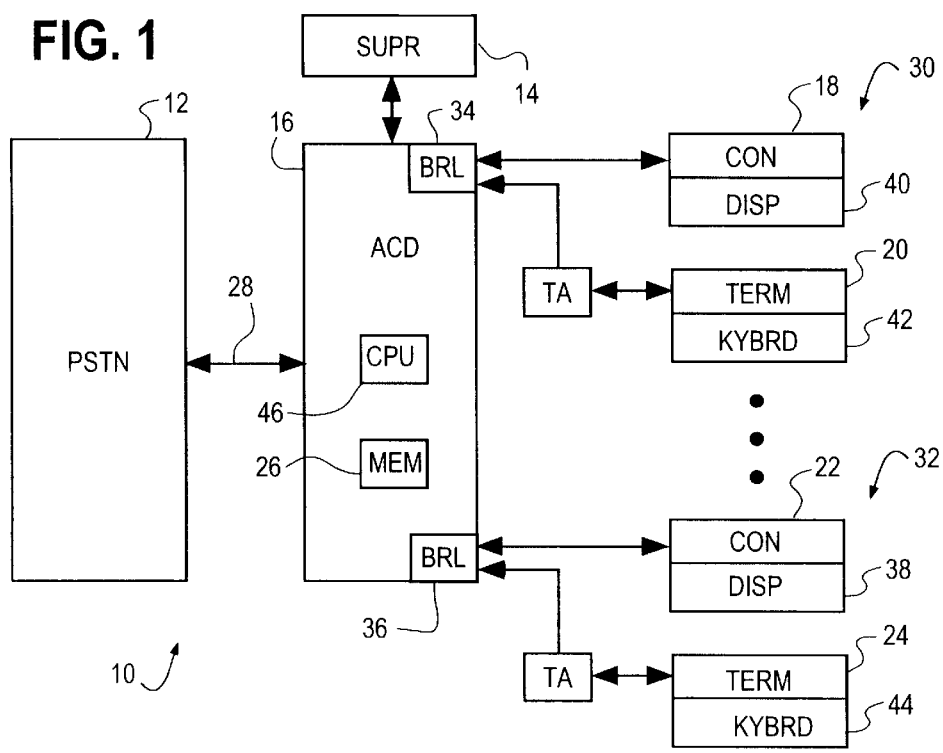

ACD WITH MULTI-LINGUAL AGENT POSITION

FIELD OF THE INVENTION

The field of the invention relates to automatic call distributors and more particularly to written text presented to agents of the automatic call distributor on consoles and terminals of agents of the automatic call distributor.

BACKGROUND OF THE INVENTION

Automatic call distribution (ACD) systems are known. Such systems are typically used in an organizational context within private branch telephone exchanges (PBXs)as a means of distributing telephone calls among a group of agents of the organization. While the automatic call distributor (ACD) may be a separate part of the PBX, often the ACD is integrated into and is an indistinguishable part of the PBX.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the ACD may distribute the calls based upon which agent position (telephone) has been idle the longest.

In order to distribute incoming calls from the PSTN to the available agents, the interaction of a controlling computer with a switching fabric of the PBX and ACD becomes essential. Often a connection to a local PSTN is in the form of a number of trunk connections. Each of the trunk connections is monitored by the controller for incoming calls. Where a call is detected, the controller searches for and selects an idle agent. Upon selecting an agent, the controller commands the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer the call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

Calls are typically placed in a queue when insufficient agents are available to answer the calls as they appear on incoming trunks. Messages are often delivered to callers in the queue as they wait for the next available agent.

The economic benefit provided by an ACD lies generally it its ability to automate and facilitate call handling. Automation of call handling by the ACD is in no small part facilitated by the use of written instructions presented to the agents on the agent terminal during each step of call processing. The presentation of written instructions to the agent allows the organization using the ACD to hire agents with little or no computer skills.

For instance, an ACD typically assigns calls based upon an agent's qualifications. To determine what agents are available at any given instant, the ACD requires an agent to sign in at a beginning of a shift and to sign out at an end of a shift. To facilitate this process, the ACD presents written instructions on a terminal screen of the steps to follow in signing in.

Once signed on, the ACD may present further instructions to the agent. For instance, text may be presented on the terminal screen specifying a particular greeting to use on a first contact with the customer. Instructions may be presented as to what questions to ask.

Once basic information has been solicited from the customer, further instructions may be provided on what resources to use in servicing the customer. Information may be offered on how to transfer the call to another agent in the event that a first agent is not qualified to service the call.

While the concept of written instructions has worked well, most ACDs are structured to present textual information only in the English language. While most terminals are inherently able to process characters in any language, most instructional messages to an agent originate from the ACD and in the programming of the ACD. Because of the many multi-lingual uses for ACDs a need exists for a way of easily adapting ACDs for use with other languages.

SUMMARY

A method and apparatus are provided for selecting a language for use by a plurality of agents of an automatic call distributor. The method includes the steps of storing an indication of the selected language in a memory of the automatic call distributor, downloading the indication to each agent terminal of each agent of the plurality of agents upon activation of the agent terminals and programming the agent terminals to use the selected language based upon the downloaded indication of the selected language.

BRIEF DESCRIPTION OF THE DRAWINGS

FIG. 1 is a block diagram of an automatic call distributor with multi-lingual features in accordance with an embodiment of the invention, set in a context of use;

FIG. 2 is a message set lookup table that may be used in conjunction with the automatic call distributor of FIG. 1;

FIG. 3 is an message discriptor lookup table that may be used in conjunction with the automatic call distributor of FIG. 1;

FIG. 4 is a language selection lookup table that may be used in conjunction with the automatic call distributor of FIG. 1.

DETAILED DESCRIPTION OF A PREFERRED EMBODIMENT

Figure 5:
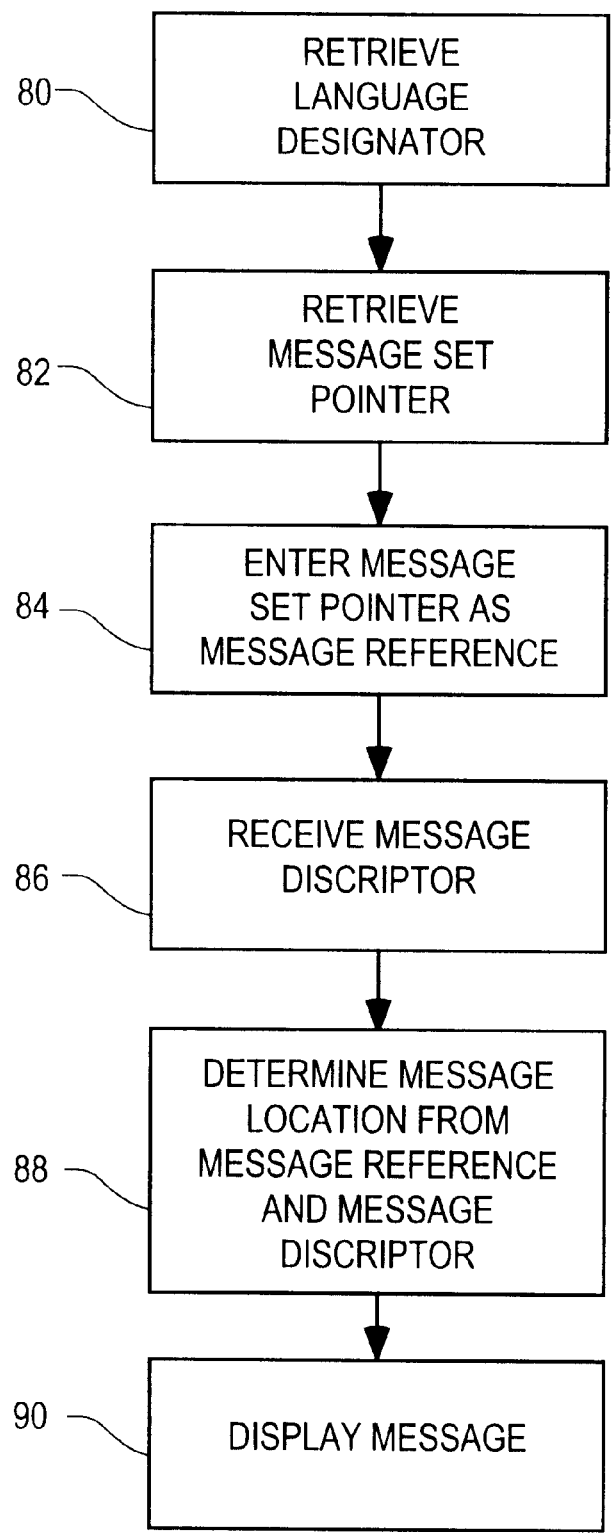
FIG. 5 is a flow chart of language selection that may be used by the automatic call distributor of FIG. 1.

FIG. 1 is a block diagram of an automatic call distribution (ACD) system 10 in accordance with an embodiment of the invention, shown in a context of use. ACDs similar to the type shown in FIG. 1 may be available from any of a number of manufacturers (e.g., the Spectrum Automatic Call Distribution system made by Rockwell International Corporation of Seal Beach, Calif.).

With regard to inbound calls, the ACD 10 functions to selectively interconnect calls from external customer units (not shown) of the PSTN 12 to agent stations 30, 32 of the ACD 16. Each agent station 30, 32 may consist of an agents computer (terminal) 20, 24 and an agents telephone (console) 18, 22.

The terminal 20, 24 may be an IBM PC, or equivalent, with networking capabilities. The console 18, 22 may be a telephone with remote display capability (e.g., a 80 character display).

The ACD 16 may be connected to the PSTN 12 through a number of trunk lines 28. The PSTN 12 may offer telephone service to the system 10 on trunk lines 28 in conjunction with a number of call-delivery features such as ANI and DNIS.

The ACD may be controlled by a central processing unit, or CPU 46 in conjunction with peripheral memory devices 26. Control of the ACD 16 may be accomplished generally as described in U.S. Pat. No. 5,268,903, and U.S. Pat. No. 5,140,611, both to Jones et.al., and both incorporated herein by reference. Routing of calls to agents 30, 32 and overflow of calls may be accomplished generally as described in: U.S. Pat. No. 5,335,269 to Steinlicht; U.S. Pat. No. 5,365,581 to Baker et al.; and U.S. Pat. No. 5,384,841 to Adams et al., all incorporated herein by reference.

During operation, the CPU 46 monitors each port of the switch of the ACD 16 for changes in status. A change in status may be an agent console 18, 22 going off-hook to make a call, an agent console 18, 22 hanging up after a call, or it may be a call alerting tone detected on a trunk 28 alerting the CPU 46, to the presence of an incoming call.

Where the status change is an agent hanging up, the CPU 46 acts to tear-down the call connection within the switch 16 between the agent at a first port of the switch and a second party to the conversation communicating through a second port of the switch 16.

Where the status change is an agent console 18, 22 going offhook, the CPU 46 interprets such change as preparation for the placement of a telephone call. As such, the CPU 46 prepares to receive a set of dialed digits. Upon receiving the digits and if the digits are determined as being a call directed to an outside party, then the CPU 46 may seize an outgoing trunk line 30 and send a call alert followed by the dialed digits. Where the alert is answered by a call connection acknowledgment, the CPU 46 completes the connection between the port of the agent (e.g., 34, 36) and the port of the seized trunk line.

If the call is directed to another agent or some other party within the organization, then the CPU 46 may identify the port to which the calling party is to be connected by reference to a look-up table within memory 26. Upon locating the party, the CPU 46 may then cause a connection to be set-up between appropriate ports within the switch 16 between the calling and called party.

Where the status change is a call alert signal on an incoming trunk line (or a control channel associated with an incoming trunk line), then the CPU 46 may send an acknowledge message to the PSTN 12 accepting the call. The PSTN 12 may respond with the forwarding of DNIS and ANI messages, identifying the called and calling party.

Upon accepting the call, the CPU 46 first stores the DNIS and ANI numbers in a termination table of the memory 26. More specifically, the CPU 46 maintains a table of call information for each port of the switch 16. Where a call is accepted on an incoming trunk line, the CPU 46 enters the DNIS and ANI number into the table for the incoming trunk line upon which the call is received.

The CPU 46 then, by reference to the DNIS number, determines the identity of agent 30, 32 to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 30, 32 (or group of agents) the CPU 46 instructs the switch 16 to internally connect the port of the incoming trunk to the port of the identified agents.

Where the call has been connected to an agent, the CPU 46 stores the port number of the identified agent in the termination table for the port of the incoming trunk. Likewise, the CPU 46 stores the port identifier of the incoming trunk in the termination table of the identified agent.

During operation of the ACD 10, messages are periodically exchanged between the agent stations 30, 32 and the CPU 46. Messages transferred from the agent station 30, 32 to the CPU 46 are typically status messages (e.g., call on-hook, call off-hook, etc.) or status change requests (e.g., agent sign-on, call transfer, etc.). Such messages are transparent to the language of the system user and will not be considered here.

In contrast, messages from the system 10 (e.g., the CPU 46) to a user (e.g., an agent) are of critical importance to proper use of the system. Messages from the system to users are often displayed as visual text messages and are often necessary for interpretation of system status and for determinations of proper system inputs.

For example, where a station 30, 32 is idle, the CPU may display the message "PLEASE SIGN IN" on one or both the console 18, 22 and terminal 20, 24. Information may also be provide as to the manner in which an agent may sign in. Where an agent signs in through a terminal 20, 24 by entering an agent code (identifier), the CPU 46 identifies the agent through the code, retrieves a set of agent qualifications based upon that code and assigns the agent to an agent group based upon the agent's qualifications. Calls may then be assigned to the agent based upon the agent's qualifications and upon the level of incoming calls to that group.

Based upon an agent's qualifications, the agent may be simultaneously assigned to more than one group. As a consequence, calls may be directed to the agent from different types of callers about different products.

To facilitate the agent's performance in such an environment, the CPU 46 delivers call messages in association with delivery of a call. For example, where from the DNIS information, it is determined that the call is directed to a particular group of agents to which the agent is assigned, a message may appear indicating the target group of the call.

Further, based upon ANI information, the identity of the caller may also be displayed to the agent. If the caller is a pre-existing customer, information about the customer may be retrieved from a database of the ACD after the call has been answered and may be displayed on a terminal of the selected agent station 30, 32.

Once a call has been answered by an agent, additional information and message may be displayed for the benefit of an agent. For example, functional directories of other agents groups may be displayed. Instructions for call transfers may be offered. Instructions and softkeys for supervisor assistance may be presented to the agent. Text for sales presentations to customers may be presented to the agent which may be read to the calling party.

Under the embodiment, the ACD 10 may present messages to agents under any of a number of languages. The ACD may be setup for use with any particular language (e.g., German) by a supervisor (not shown) entering a default language indicator through a supervisor's terminal 14. Setup of the default language may be accomplished under any of a number of formats.

FIG. 5 is a flow chart of method steps that may be followed for programming the selected language into an agent station under an illustrated embodiment of the invention. Reference shall be made to FIG. 5 as appropriate to an understanding of the invention.

For example, a default language may be entered as part of an ACD attributes table stored in a memory 26 of a processor 30 of the ACD 10. The supervisor may access the file at any time after startup of the ACD 10 for purposes of programming the file through the supervisor's terminal 14 with the language indicator.

All or any part of the attribute file and language indicator may also be downloaded to each basic rate line (BRL) interface and, in turn, to the individual agent stations 30, 32. For example, retrieval 80 of the language indicator may be accomplished by each BRL 34, 36 during startup of the ACD 10, since the BRL 34, 36 is part of the ACD 10. Retrieval 80 of the language indicator to the terminals 20, 24 may also be accomplished during startup of those terminals 20, 24.

Once the language indicator has been downloaded to the BRL 34, 36, the indicator may be used to activate a language utility which formats messages (displayed to the agents) into a language consistent with the language indicator. For example, messages transferred from the CPU 46 to the BRL 34, 36 would not be expected to change based upon the language indicator. Messages displayed 90 on a display 38, 40 or on terminals 20, 24, however, would be expected to change based upon the language indicator.

In order to display messages in an appropriate language, an appropriate message set may be created for each language. In order to locate a corresponding message in each message set, each message may be offset from a first (e.g., a base) message by a predetermined memory distance.

Alternatively, a set of message (offset) pointers may be established based upon a pointer to the base message of the message set. Selection in each message of a set may be accomplished via a lookup table 60 (FIG. 3) which may be entered with a message number 62, 66 which then may be used to retrieve 88 a memory offset 64, 68 from the base message.

Entry into the base message of each message set may be accomplished via the language indicator and a language lookup table 50 (FIG. 2). The language indicator may be used to enter the language lookup table using an identifier 52, 56 of the language. Within the language lookup table, the language identifier may be used to identify and retrieve 84 a pointer 54, 58 to the base message of the message set corresponding to the particular language chosen. The pointer to the message set may be used as a base reference for retrieval of later messages based upon message descriptors received from the CPU 46.

Further, instead of offsets from a base message, a lookup table 60 (FIG. 3) could be used to find the messages of a message set. A language pointer 54, 58 would first be retrieved 82 based upon the language indicator from the CPU 46. The language pointer 54, 58 would identify 84 a unique message lookup table 60. The lookup table may be entered using a message descriptor 86 62, 66 (e.g., message #1, text #1, etc.). The descriptor may be used to locate 88 an absolute pointer 64, 68 to the text of the message in the language of the message set.

Alternatively, the language utility of a BRL 34, 36 may be used to download a unique message set from the memory 26 of the CPU 46 to a predetermined memory area of BRL 34, 36 based upon each language indicator. Each time a new language were selected, a new message set would be downloaded to the memory area of the BRL 34, 36. For example, a first language indicator (e.g., for English) would result in the downloading of a message set in English to the memory area. A second language indicator (e.g., German) would result in the downloading of a second message set to the memory area. Since each message set would occupy the same memory area, the use of this alternative would not require the use of pointers to a base message.

Turning now to the terminal 20, 24, a somewhat similar process may be used. As each terminal 20, 24 is activated, the terminal 20, 24 retrieves the language indicator from the BRL 34, 36. With the language indicator, the terminal 20, 24 may search a lookup table 50 to locate a pointer to the appropriate message set.

With the pointer to the appropriate message set 54, 58, the terminal 20, 24 may receive message descriptors 62, 64 from the CPU 46 and retrieve messages in the appropriate language. To retrieve and display messages in the appropriate language, the terminal 20, 24 may retrieve text as described above for the fixed offset method or may refer to a message set lookup table 60 to locate a particular message 64, 68. Once the text of a particular message is located, it may be displayed as under the prior art.

As a second step of formatting the terminal 20, 24 for use with a language indicator, an interface (not shown) of the keyboard 42, 44 is programmed for the selected language. As the language indicator is downloaded to the terminal 20, 24, a language utility may be activated to translate the meaning of ASCII codes received from some or all of the keys of the keyboard 42, 44 for display on a CRT of the terminal 20, 22. The re-assignment of the meaning of the ASCII codes from the keys of the keyboard allows for the meaning of each key to be changed (e.g., for the creation of Japanese or Chinese characters).

Since information entered by an agent would typically be stored in a customer database (e.g., ACD memory 26), the language used would be transparent to the system. For example, translation of the code of each key of the keyboards 40, 42 would simply result in a different meaning being displayed on the CRT. Since ASCII codes are not processed by the CPU 46, BRL 34, 36 or terminals 20, 24 translation would not have any impact upon the operation of the system 10.

Under another embodiment of the invention, reports generated by the CPU 46 may also be formatted under the default language selected through the supervisor terminal 14. Reports that may be provided by the CPU 46 may be directed to such system related statistics as calls per hour, calls per agent, minutes per call, call per group, or any statistic indicative of system productivity.

It is contemplated that under the embodiment the software doing the statistical analysis would not be affected by any change in default language. Changes in default language, in fact, would be primarily lead to changes in report headings, explanatory notes, etc.

To accommodate changes in the default language, a set of pointers may be incorporated into a message processing utility of software responsible for generation of system reports. For example, upon calling of the report generation software, the message processing utility may first retrieve the language indicator from the system attribute file. From a language pointer lookup table 50, a message set may be identified which contains the appropriate headers and explanatory text for a particular report.

Once a particular message set has been identified, message descriptors from the various fields of the report may be used to route the CPU 46 to the appropriate message of the message set based upon the recovered message set pointer and message descriptor. For example, the message set point 54, 58 may be used as a variable to route the CPU 46 to the descriptor lookup table 60. Once the CPU 46 accesses the proper descriptor lookup table 60, the CPU 46 may then retrieve the appropriate message based upon the message discriptor. Once routed to the appropriate message set and message, the heading or textual information may be retrieved and routed to a display or printer as appropriate for proper report generation.

Under another embodiment of the invention, once an agent station 30, 32 is signed on, a menu 70 (FIG. 4) is presented on a screen (not shown) of the terminals 20, 24. The menu allows an agent to select a language different from the default language entered by a supervisor and select a language more suited to the agent's needs.

Under the embodiment, the header 72 may indicate the language options available to the agent. The header 72 may be presented in the default language selected by the supervisor through the supervisor terminal 14.

To select a language, the agent places a mouse (not shown) over a selected language selection 74, 76, 78 and activates a button on the mouse. Activation of the button highlights the selection. The agent may then click on the header 72 to make the language change.

Upon making the local language change, the terminal 20, 24 may refer to a language lookup table 50 to find a pointer to the correct message set. The pointer to the correct message set may be entered 84 in the terminal 20, 24 as a message set reference. Once a message set reference has been determined and a message descriptor is received from the CPU 46, the terminal 20, 24 may retrieve the appropriate message for display either by the fixed offset described above, or by reference to the lookup table 60.

A specific embodiment of a method and apparatus for selecting a language for agents of an automatic call distributor according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of selecting a language for use by a plurality of agents of an automatic call distributor, such method comprising the steps of:

storing an indication of the selected language in a memory of the automatic call distributor;

downloading the indication to each agent station of each agent of the plurality of agents; and programming the agent stations to use the selected language based upon the downloaded indication of the selected language.

2. The method of selecting a language as in claim 1 wherein the step of programming the agent stations further comprises activating a language utility within a terminal of the agent stations.

3. The method of selecting a language as in claim 2 wherein the step of activating the language utility further comprises choosing the selected language from a plurality of other languages available within the language utility of the terminal.

4. The method of selecting a language as in claim 1 where in the step of programming the agent stations further comprises accessing a message display utility which displays messages from the automatic call distributor and using the indication as a pointer to a memory address.

5. The method of selecting a language as in claim 4 wherein the step of using the indication as a pointer to a memory address further comprises inserting the pointer in a text retrieval routine.

6. The method of selecting a language as in claim 5 wherein the step of using the indication as a pointer to a memory address further comprises using the pointer as a memory address offset by adding the pointer to a base pointer.

7. The method of selecting a language as in claim 1 further comprising downloading the indication to a basic rate line interface interfacing the automatic call distributor and a display on a telephone console of each agent.

8. The method of selecting a language as in claim 7 wherein the step of downloading the indication to the basic rate line interface further comprises accessing a message display utility which displays messages from the automatic call distributor and using the indication as a pointer to a memory address.

9. The method of selecting a language as in claim 8 wherein the step of using the indication as a pointer to a memory address further comprises inserting the pointer in a text retrieval routine.

10. The method of selecting a language as in claim 9 wherein the step of using the indication as a pointer to a memory address further comprises using the pointer as a memory address offset by adding the pointer to a base pointer.

11. Apparatus for selecting a language for use by a plurality of agents of an automatic call distributor, such apparatus comprising:

means for storing an indication of the selected language in a memory of the automatic call distributor;

means for downloading the indication to each agent station of each agent of the plurality of agents; and means for programming the agent stations to use the selected language based upon the downloaded indication of the selected language.

12. The apparatus for selecting a language as in claim 11 wherein the means for programming the agent stations further comprises means for activating a language utility within a terminal of the agent stations.

13. The apparatus for selecting a language as in claim 12 wherein the means for activating the language utility further comprises means for choosing the selected language from a plurality of other languages available within the language utility of the terminal.

14. The apparatus for selecting a language as in claim 11 wherein the means for programming the agent stations further comprises means for accessing a message display utility which displays messages from the automatic call distributor and using the indication as a pointer to a memory address.

15. The apparatus for selecting a language as in claim 14 wherein the means for using the indication as a pointer to a memory address further comprises means for inserting the pointer in a text retrieval routine.

16. The apparatus for selecting a language as in claim 15 wherein the means for using the indication as a pointer to a memory address further comprises means for using the pointer as a memory address offset by adding the pointer to a base pointer.

17. The apparatus for selecting a language as in claim 11 further comprising means for downloading the indication to a basic rate line interface interfacing the automatic call distributor and a display on a telephone console of each agent.

18. The apparatus for selecting a language as in claim 17 wherein the means for downloading the indication to the basic rate line interface further comprises means for accessing a message display utility which displays messages from the automatic call distributor and using the indication as a pointer to a memory address.

19. The apparatus for selecting a language as in claim 18 wherein the means for using the indication as a pointer to a memory address further comprises means for inserting the pointer in a text retrieval routine.

20. The apparatus for selecting a language as in claim 19 wherein the means for using the indication as a pointer to a memory address further comprises means for using the pointer as a memory address offset by adding the pointer to a base pointer.

21. Apparatus for selecting a language for use by a plurality of agents of an automatic call distributor, such apparatus comprising:

a memory which stores an indication of the selected language in a memory of the automatic call distributor;

a local area network which downloads the indication to each agent station of each agent of the plurality of agents; and a memory pointer setting processor which programs the agent stations to use the selected language based upon the downloaded indication of the selected language.

22. The apparatus for selecting a language as in claim 21 wherein the pointer setting processor which programs the agent stations further comprises a boot register which activates a language utility within a terminal of the agent stations.

23. The apparatus for selecting a language as in claim 22 wherein the boot register which activates the language utility further comprises a comparator which chooses the selected language from a plurality of other languages available within the language utility of the terminal.

24. The apparatus for selecting a language as in claim 21 wherein the pointer setting processor which programs the agent stations further comprises accessing a message display utility which displays messages from the automatic call distributor and using the indication as a pointer to a memory address.

* * * * *